US011255706B2

(12) United States Patent
Li et al.

(10) Patent No.: US 11,255,706 B2
(45) Date of Patent: Feb. 22, 2022

(54) INTELLIGENT SENSING DEVICE AND SENSING SYSTEM

(71) Applicant: DALIAN CLOUD FORCE TECHNOLOGIES CO., LTD, Liaoning (CN)

(72) Inventors: Yang Li, Liaoning (CN); Mao Wang, Liaoning (CN); Chang Wang, Liaoning (CN); Ting Zhang, Liaoning (CN)

(73) Assignee: Dalian Cloud Force Technologies CO., LTD, Liaoning (CN)

( * ) Notice: Subject to any disclaimer, the term of this patent is extended or adjusted under 35 U.S.C. 154(b) by 180 days.

(21) Appl. No.: 16/607,680

(22) PCT Filed: Apr. 24, 2018

(86) PCT No.: PCT/CN2018/084201
§ 371 (c)(1),
(2) Date: Oct. 23, 2019

(87) PCT Pub. No.: WO2018/196731
PCT Pub. Date: Nov. 1, 2018

(65) Prior Publication Data
US 2020/0191623 A1    Jun. 18, 2020

(30) Foreign Application Priority Data

Apr. 27, 2017  (CN) .......................... 201710288890.4

(51) Int. Cl.
*G01D 21/02*    (2006.01)
*H04W 4/38*    (2018.01)
(Continued)

(52) U.S. Cl.
CPC ............. *G01D 21/02* (2013.01); *G08C 17/02* (2013.01); *H04L 67/12* (2013.01); *H04L 69/163* (2013.01); *H04W 4/38* (2018.02); *H04W 4/027* (2013.01)

(58) Field of Classification Search
CPC ........ G01D 21/02; H04W 4/38; H04W 4/027; H04W 4/008; G08C 17/02; H04L 69/163; G16H 40/67
(Continued)

(56) References Cited

U.S. PATENT DOCUMENTS

2006/0191318 A1*  8/2006  McBride ............ G01N 33/0009
73/23.2
2013/0311140 A1*  11/2013  Schechter ............... H04W 4/50
702/188

(Continued)

FOREIGN PATENT DOCUMENTS

| CN | 102368297 A | 3/2012 |
| CN | 104111850 A | 10/2014 |

(Continued)

OTHER PUBLICATIONS

Lina Wei, "Research and Implementation of the Counting Step Algorithm and the Calculating Stride Length Based on Acceleration"; Northeastern University, Jun. 2013, China Outstanding Master's Degree Thesis Full Text Database, Information Technology Series, No. 3, Mar. 15, 2017, ISSN: 1674-0246.

(Continued)

*Primary Examiner* — Vernal U Brown
(74) *Attorney, Agent, or Firm* — Muncy, Geissler, Olds & Lowe, P.C.

(57) ABSTRACT

An intelligent sensing device and a sensing system are disclosed. The sensing device comprises a sensor unit provided with a plurality of sensors, and a wireless communi-
(Continued)

cation module, a memory module and a processing module connected with a data platform, wherein the processing module is connected with the sensor unit, the wireless communication module and the memory module; the processing module acquires the motion condition of a user by means of a preset detection algorithm according to a detection result of the acceleration sensor; and the sensing device has multiple different modes corresponding to different preset detection algorithms, and the user selects the preset detection algorithm by setting the mode of the sensing device. The sensing device is extremely low in power consumption, good in stability and sensitivity and high in storage capacity, can be interconnected with the data platform, and allows various sensors to be accessed thereto.

13 Claims, 7 Drawing Sheets

(51) Int. Cl.
*G08C 17/02* (2006.01)
*H04L 67/12* (2022.01)
*H04L 69/163* (2022.01)
*H04W 4/02* (2018.01)

(58) Field of Classification Search
USPC .......................................................... 702/121
See application file for complete search history.

(56) References Cited

U.S. PATENT DOCUMENTS

| 2014/0197946 A1* | 7/2014 | Park | G06F 19/00 340/539.11 |
| 2015/0237460 A1* | 8/2015 | Goyal | G01D 11/00 455/41.2 |

FOREIGN PATENT DOCUMENTS

| CN | 104799826 A | 7/2015 |
| CN | 107124458 A | 9/2017 |
| WO | WO 2016/133088 A1 | 8/2016 |

OTHER PUBLICATIONS

Wang Chang et al., "Research on multi-algorithmic intelligent monitoring system based on the Internet of Things"; Application of Electronic Technique, vol. 43, No. 11, Nov. 6, 2017, ISSN: 0258-7998.

* cited by examiner

INTELLIGENT SENSING DEVICE AND SENSING SYSTEM

BACKGROUND OF THE INVENTION

1. Technical Field

The invention relates to an intelligent sensing device and a sensing system.

2. Description of Related Art

In the present information-based society, the communication requirements are not only limited to communications between people anymore. The development of the sensor technology and the network technology has made it possible to realize communications between people and articles as well as between articles. Intelligent sensing devices come into being on this background.

Intelligent sensing devices in the prior art have defect of severe fragmentation and can only sense one parameter. For instance, the sensing devices on the current market are able to sense the temperature or light only. These sensing devices cannot be effectively linked, which in turn causes losses of the correlations between data and events. It is impossible to meet user requirements by installation of only one sensing device. For the sake of fully-intelligent experience, several or even more sensing devices have to be installed, and these sensing devices are generally controlled by several or even more data platforms, which goes against the original intention for intelligence, brings trouble to users, and results in resource waste. In addition, almost all existing intelligent sensing devices have the problems of limited transmission distance, poor reliability and complex configuration. For instance, many sensing devices adopting the 433 MHz wireless technology and Zigbee technology to realize short-range communications usually have to synchronize data onto a master controller in a unified manner, and then the data is directly accessed to an external Internet to realize communication. However, with the increase of the number of devices, a bottleneck may occur in the communication process; the narrow communication bandwidth is not suitable for transmitting high-frequency or high-volume data (such as images and sounds); and moreover, the existing sensing devices have to be supplied with power from the outside due to their high power consumption, which leads to installation and usage limitations and inflexibility.

BRIEF SUMMARY OF THE INVENTION

To solve the above-mentioned problems, the invention provides an intelligent sensing device.

The technical means adopted by the invention is as follows:

An intelligent sensing device comprises a sensor unit provided with a plurality of sensors, a wireless communication module connected with a data platform, a memory module and a processing module, wherein the processing module is connected with the sensor unit, the wireless communication module and the memory module;

The sensor unit includes at least two of a temperature sensor, a humidity sensor, an ambient light sensor, a magnetic field sensor, an acceleration sensor and a vibration sensor, and the wireless communication module at least includes a WIFI chip; and The processing module acquires the motion condition of a user by means of a preset detection algorithm according to a detection result of the acceleration sensor; and the sensing device has multiple different modes corresponding to different preset detection algorithms, and the user selects the preset detection algorithm by setting the mode of the sensing device.

Furthermore,

The sensor unit further includes at least one of a wind speed sensor, a pH sensor, a light intensity sensor, a dissolved oxygen sensor, a carbon dioxide sensor, an air quality sensor, a door magnetic sensor and a noise sensor; and The sensing device further comprises a USB interface conversion module, a mode conversion switch, a voltage conversion module, a voltage stabilizing module and a clock module which are connected with the processing module.

Furthermore, the processing module saves received sensor data output by the sensor unit by means of memory structures, wherein each memory structure contains a plurality of pieces of data which are separated by separators, and each piece of data includes sensor data and corresponding sensor data reception timestamp information and sensor type information; the processing module sequentially arrays the memory structures in a creation sequence to form a data stream which is uploaded to the data platform according to a preset upload cycle; and the processing module directly uploads corresponding sensor data to the data platform according to preset interrupt information received.

Furthermore, before saving the received sensor data output by the sensor unit, the processing module carries out CRC on the sensor data, saves sensor data passing CRC, and reads CRC error values corresponding to sensor data not passing CRC.

Furthermore,

After the data stream or the sensor data is uploaded to the data platform, the processing module deletes corresponding data saved in the sensing device;

When needing to upload the data stream or the sensor data to the data platform, the processing module establishes a WIFI connection through the wireless communication module first; when the WIFI connection succeeds, the processing module reads the to-be-uploaded data stream or sensor data; if the to-be-uploaded data stream or sensor data is successfully read by the processing module, the sensing device is connected to the data platform, and the processing module runs a watchdog monitoring program at the same time; and The data platform is able to send instructions to the sensing device, and the sensing device sends operation information for deleting all instruction queues to the data platform so as to refuse to receive new instructions.

Furthermore,

A clock of the sensing device is kept synchronous with a clock of the data platform;

The processing module is internally provided with a real-time operating system (RTOS); and The processing module is a processor integrally provided with an AD sampling circuit, wherein the AD sampling circuit includes a first division resistor and a second division resistor which are connected in series, and one terminal of the second division resistor is grounded when the AD sampling circuit carries out sampling and is not grounded when the AD sampling circuit does not carry out sampling.

Furthermore, the processing module operates or sleeps according to an intelligent scheduling intermittent sleeping algorithm;

Wherein, the intelligent scheduling intermittent sleeping algorithm includes:

① Acquiring a current time Ts of a system and preset next running times T1, T2, T3, . . . , and Tm of current to-be-run tasks 1, 2, . . . , and m, and performing ②;

② Sequentially working out execution frequencies F1, F2, F3, . . . , and Fm of the current to-be-run tasks 1, 2, . . . , and m, wherein F1=T1−Ts, F2=T2−Ts, F3−Ts, . . . , and Fm=Tm−Ts; and performing ③;

③ Determining a minimum value Fs among the execution frequencies F1, F2, F3, . . . , and Fm of the current to-be-run tasks 1, 2, . . . , and m, determining a task to be run next time and figuring out a next running time T' of the system according to T'=Ts+Fs, and performing ④;

④ Switching the system into a dormant state, and performing ⑤; and

⑤ Switching the system into an awake state when the current time of the system reaches the next running time T of the system, running the corresponding task, and returning to ①.

Furthermore, the preset detection algorithm at least includes a peak detection algorithm and a dynamic threshold detection algorithm;

The peak detection algorithm includes:

① Obtaining acceleration data sequentially output by the acceleration sensor within a time period s, wherein the acceleration data includes an x-axis acceleration, a y-axis acceleration, and a z-axis acceleration; and performing ②;

② Determining whether or not the sampling frequency of the acceleration sensor is greater than a preset sampling frequency; if yes, performing ④; or, if not, performing ③;

③ Calculating $f(t) = \sqrt{(x_t - x_{t-1})^2 + (y_t - y_{t-1})^2 + (z_t - z_{t-1})^2}$ . . . ($t \geq 1$), wherein f(t) represents the amplitude of a $t^{th}$ piece of acceleration data within the time period s, x(t) represents an x-axis acceleration corresponding to a $t^{th}$ piece of acceleration data, y(t) represents a y-axis acceleration corresponding to the $t^{th}$ piece of acceleration data, z(t) represents a z-axis acceleration corresponding to the $t^{th}$ piece of acceleration data, x(t−1) represents an x-axis acceleration corresponding to a $(t−1)^{th}$ piece of acceleration data, y(t−1) represents a y-axis acceleration corresponding to the $(t−1)^{th}$ piece of acceleration data, z(t−1) represents a z-axis acceleration corresponding to the $(t−1)^{th}$ piece of acceleration data, t represents the sequence of the acceleration data within the time period s; and performing ⑤;

④ Calculating $$f(t) = \begin{cases} \sqrt{(x_t - x_{t-2})^2 + (y_t - y_{t-2})^2 + (z_t - z_{t-2})^2} & \ldots (t = 2n, n \geq 1) \\ \sqrt{(x_t - x_{t-2})^2 + (y_t - y_{t-2})^2 + (z_t - z_{t-2})^2} & \ldots (t = 2m+1, n \geq 1) \end{cases},$$

wherein f(t) represents the amplitude of the $t^{th}$ piece of acceleration data within the time period s, x(t) represents the x-axis acceleration corresponding to the $t^{th}$ piece of acceleration data, y(t) represents the y-axis acceleration corresponding to the $t^{th}$ piece of acceleration data, z(t) represents the z-axis acceleration corresponding to the $t^{th}$ piece of acceleration data, x(t−2) represents an x-axis acceleration corresponding to a $(t−2)^{th}$ piece of acceleration data, y(t−2) represents a y-axis acceleration corresponding to the $(t−2)^{th}$ piece of acceleration data, z(t−2) represents a z-axis acceleration corresponding to the $(t−2)^{th}$ piece of acceleration data, t represents the sequence of the acceleration data within the time period s; and performing ⑤;

⑤ Obtaining an average value $$F(s) = \frac{1}{T}\sum_{1}^{T} f(t)$$

of the amplitudes of all the acceleration data within the time period s, wherein T represents the quantity of the acceleration data within the time period s; and performing ⑥; and ⑥ Comparing the average value F(s) of the amplitudes of all the acceleration data within the time period s with a preset value, and determining whether or not the user falls at present according to a comparison result;

The dynamic threshold detection algorithm includes:

I: Obtaining acceleration data sequentially output by the acceleration sensor, wherein the acceleration data includes an x-axis acceleration, a y-axis acceleration, and a z-axis acceleration; and performing II;

II: Calculating, when N pieces of acceleration data are obtained, an average value of the N pieces of acceleration data, using the average value as a dynamic threshold, and performing III;

III: Comparing acceleration data obtained every time after the dynamic threshold is worked out with the dynamic threshold, determining whether or not the user steps according to a comparison result, and performing IV; and IV: Recalculating an average value of N pieces of acceleration data obtained after the dynamic threshold is worked out, updating the dynamic threshold, and returning to III.

Furthermore, original sampling data output by the sensors is saved by the processing module to be directly used as the sensor data, or data obtained after the original sampling data output by the sensors is processed through a preset processing method is saved by the processing module to be used as the sensor data, wherein the preset processing method at least includes a first processing method, a second processing method and a third processing method; different processing methods correspond to the different modes of the sensing device, and the user selects the preset pressing method by setting the mode of the sensing device;

The first processing method includes: obtaining $$\bar{x}_1 = \frac{1}{N}\sum_{i=1}^{N} x_i = \frac{x_1 + x_2 + x_3 + \ldots + x_N}{N},$$

$$\bar{x}_2 = \frac{1}{N}\sum_{i=N+1}^{2N} x_i = \frac{x_{N+1} + x_{N+2} + x_{N+3} + \ldots + x_{2N}}{N}, \ldots, \text{and}$$

$$\bar{x}_N = \frac{1}{N}\sum_{i=(N-1)N}^{NN} x_i = \frac{x_{(N-1)N} + x_{(N-1)N+1} + \ldots + x_{NN}}{N},$$

wherein $x_N$ represents original sampling data obtained by a $N^{th}$ time of sampling of the sensors, $x_{2N}$ represents original sampling data obtained by a $2N^{th}$ time of sampling of the sensors, and $x_{NN}$ represents original sampling data obtained by a $NN^{th}$ time of sampling of the sensors;

The second processing method includes: obtaining $$K_1 = \frac{x_{max1} - x_{min1}}{N} (x_{max1}, x_{min1} \in \{x_1, x_2, x_3, \ldots x_N\}),$$

-continued $$K_2 = \frac{x_{max2} - x_{min2}}{N} (x_{max2}, x_{min2} \in \{x_{N+1}, x_{N+2}, x_{N+3}, \ldots x_{2N}\}), \ldots, \text{ and}$$

$$K_N = \frac{x_{maxN} - x_{minN}}{N} (x_{maxN}, x_{minN} \in \{x_{(N-1)N}, x_{(N-1)N+1} \ldots x_{NN}\}),$$

wherein $x_N$ represents original sampling data obtained by the $N^{th}$ time of sampling of the sensors, $x_{2N}$ represents original sampling data obtained by the $2N^{th}$ time of sampling of the sensors, $x_{NN}$ represents original sampling data obtained by the $NN^{th}$ time of sampling of the sensors, $x_{max1}$ represents the maximum value among original sampling data $x_1$, $x_2$, $x_3$, ... $x_N$ of the sensors, $x_{min1}$ represents the minimum value among the original sampling data $x_1$, $x_2$, $x_3$, ... $x_N$ of the sensors, $z_{max2}$ represents the maximum value among original sampling data $x_{N+1}$, $x_{N+2}$, $x_{N+3}$, ... $x_{2N}$ of the sensors, $x_{min2}$ represents the minimum value among the original sampling data $x_{N+1}$, $x_{N+2}$, $x_{N+3}$, ... $x_{2N}$ of the sensors, $x_{maxN}$ represents the maximum value among original sampling data $x_{(N-1)N}$, $x_{(N-1)N+1}$ ... $x_{NN}$ of the sensors, and $x_{minN}$ represents the minimum value among the original sampling data $x_{(N-1)N}$, $x_{(N-1)N+1}$ ... $x_{NN}$ of the sensors;

The third processing method includes: ① calculating an average value and a variance of original sampling data of N sensors; and ② sequentially calculating the statistic $$T_i = \frac{x_i - \overline{X}}{S}$$

($i=1, 2, \ldots,$ and N) of the original sampling data of the N sensors; rejecting original sampling data $x_i$ meeting $T_i \geq T_{\alpha,n}$ of the corresponding sensor, and returning to ① when original sampling data of N sensors are obtained again until the statistics of the original sampling data of all the sensors are calculated, wherein $\overline{X}$ represents the average value of the original sampling data of the sensors, S represents the variance of the original sampling data of the N sensors, $x_i$ represents the original sampling data of the $i^{th}$ sensor, and $T_{\alpha,n}$ represents a critical value obtained with reference to the Grubbs Table;

The original sampling data of the sensors and the data obtained after the original sampling data of the sensors are processed through different processing methods are output in a data structural form including data information and data type information, and the original sampling data of the sensors and the different preset processing methods are distinguished according to different data type information.

Furthermore, the sensing device is provided with a voiceprint recognition device; the user broadcasts WIFI configuration information by means of voiceprints, and the voiceprint recognition device analyzes and recognizes the voiceprints and then converts the voiceprints into the corresponding WIFI configuration information; and the user controls one or more sensing devices by means of voice through the voiceprint recognition device.

Furthermore, the wireless communication module is able to work in an AP mode and an STA mode, and the AP mode is configured through the following steps:

A1: Enabling the AP mode, and performing A2;
A2: Waiting to obtain an IP, and performing A3;
A3: Establishing a TCP connection, and performing A4;
A4: Tracking the TCP connection, and performing A5;
A5: Receiving a TCP command, and performing A6;
A6: Determining the type of the TCP command, and performing A7;

A7: If the TCP command is an exit command or a configuration command, receiving the TCP command, and performing A8; or, if the TCP command is a command for reading sensing device information, sensor information, or error information, receiving the TCP command, and returning to A6;

A8: Sending an AP mode configuration result, and performing A9;

A9: Turning off the TCP connection, and performing A10;

A10: Configuring the STA mode, and performing A11; and

A11: Exiting a configuration process of the AP mode.

Furthermore, the sensing device is able to be connected to a user terminal, and the user implements the configuration process of the AP mode by means of the user terminal, and checks AP mode configuration information, the sensing device information, the sensor information, and/or the error information via the user terminal.

Furthermore, the sensing device at least comprises a USB interface, a microusb interface, and/or a miniUSB interface and is connected to the user terminal via the USB interface; the user terminal is a mobile phone, a tablet computer, or a PC; and data saved in the sensing device is guided into the user terminal via the USB interface.

A sensing system comprises:
a plurality of intelligent sensing devices mentioned above; and
a data platform connected with the plurality of sensing device.

By adoption of the above technical solution, the intelligent sensing device of the invention is extremely low in power consumption, good in stability and sensitivity and high in storage capacity, can be interconnected with a data platform, and allows various sensors to be accessed thereto; and the sensing system is provided with one data platform and a plurality of sensing devices interconnected with the data platform by means of WIFI wireless transmission, so that sensing data are synchronized into the data platform of the background Internet directly through the Internet by means of wireless WIFI, and users can obtain data transmitted from the sensing devices anywhere in the world by visiting the Web browser via smartphones or computers.

Figure 1:
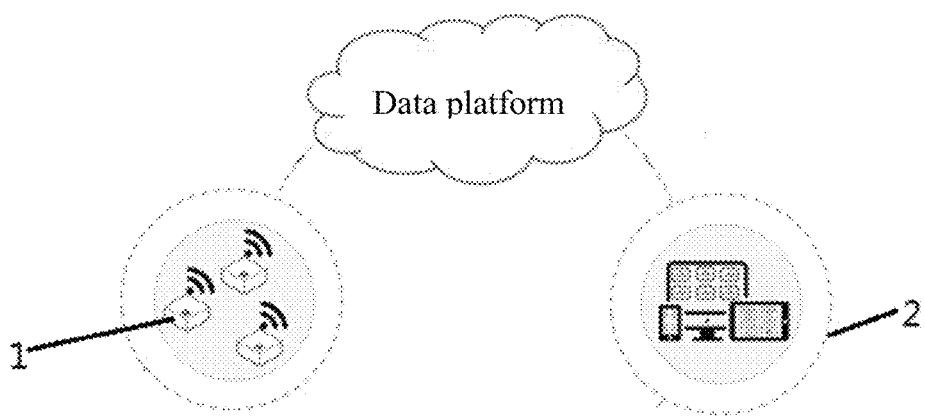
FIG. 1 is a structural diagram of a sensing system of the invention.
Figure 2:
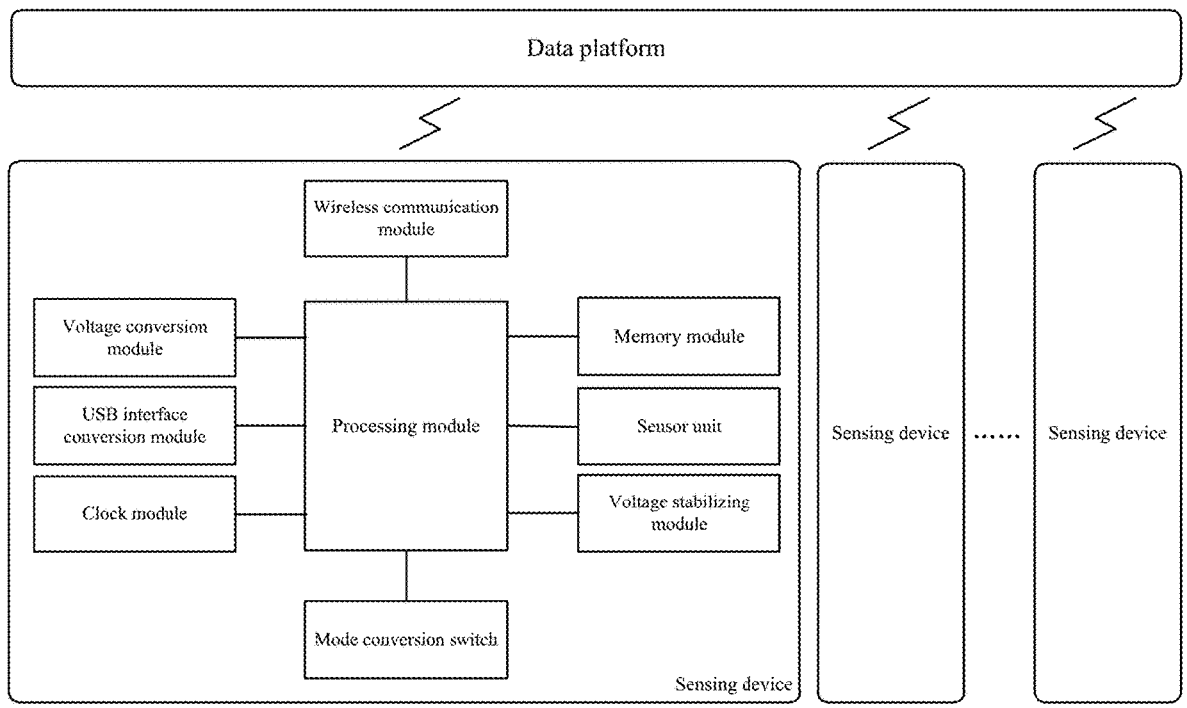
FIG. 2 is an illustrative structural diagram of the sensing system of the invention.

Reference Signs: 1, sensing device; 2, user access terminal.

DETAILED DESCRIPTION OF THE INVENTION

As shown in FIG. 1, FIG. 2, FIG. 3, FIG. 4, FIG. 5 and FIG. 6, an intelligent sensing device comprises a sensor unit provided with a plurality of sensors, a wireless communication module connected with a data platform, a memory module and a processing module, wherein the processing module is connected with the sensor unit, the wireless communication module and the memory module; the sensor unit includes at least two of a temperature sensor, a humidity sensor, an ambient light sensor, a magnetic field sensor, an acceleration sensor and a vibration sensor, and the wireless communication module at least includes a WIFI chip; the processing module acquires the motion condition of a user by means of a preset detection algorithm according to a detection result of the acceleration sensor; and the sensing device 1 has multiple different modes corresponding to different preset detection algorithms, and the user selects the preset detection algorithm by setting the mode of the sensing device 1. Furthermore, the sensor unit further includes at least one of a wind speed sensor, a pH sensor, a light intensity sensor, a dissolved oxygen sensor, a carbon dioxide sensor, an air quality sensor, a door magnetic sensor and a noise sensor; and the sensing device 1 further comprises a USB interface conversion module, a mode conversion switch, a voltage conversion module, a voltage stabilizing module and a clock module which are connected with the processing module. Furthermore, the processing module saves received sensor data output by the sensor unit by means of memory structures, wherein each memory structure contains a plurality of pieces of data which are separated by separators, and each piece of data includes sensor data and corresponding sensor data reception timestamp information and sensor type information; the processing module sequentially arrays the memory structures in a creation sequence to form a data stream which is uploaded to the data platform according to a preset upload cycle; and the processing module directly uploads corresponding sensor data to the data platform according to preset interrupt information received. Furthermore, before saving the received sensor data output by the sensor unit, the processing module carries out CRC on the sensor data, saves sensor data passing CRC, and reads CRC error values corresponding to sensor data not passing CRC. Furthermore, after the data stream or the sensor data is uploaded to the data platform, the processing module deletes corresponding data saved in the sensing device 1; when needing to upload the data stream or the sensor data to the data platform, the processing module establishes a WIFI connection through the wireless communication module first; when the WIFI connection succeeds, the processing module reads the to-be-uploaded data stream or sensor data; if the to-be-uploaded data stream or sensor data is successfully read by the processing module, the sensing device 1 is connected to the data platform, and the processing module runs a watchdog monitoring program at the same time; and the data platform is able to send instructions to the sensing device 1, and the sensing device 1 sends operation information for deleting all instruction queues to the data platform so as to refuse to receive new instructions. Furthermore, a clock of the sensing device 1 is kept synchronous with a clock of the data platform; the processing module is internally provided with a real-time operating system (RTOS); and the processing module is a processor integrally provided with an AD sampling circuit, wherein the AD sampling circuit includes a first division resistor and a second division resistor which are connected in series, and one terminal of the second division resistor is grounded when the AD sampling circuit carries out sampling and is not grounded when the AD sampling circuit does not carry out sampling.

Furthermore, the processing module operates or sleeps according to an intelligent scheduling intermittent sleeping algorithm;

Wherein, the intelligent scheduling intermittent sleeping algorithm includes:

① A current time Ts of a system and preset next running times T1, T2, T3, . . . , and Tm of current to-be-run tasks 1, 2, . . . , and m are acquired, and ② is performed;

② Execution frequencies F1, F2, F3, . . . , and Fm of the current to-be-run tasks 1, 2, . . . , and m are sequentially worked out, wherein F1=T1−Ts, F2=T2−Ts, F3=T3−Ts, . . . , and Fm=Tm−Ts; and ③ is performed;

③ The minimum value Fs among the execution frequencies F1, F2, F3, . . . , and Fm of the current to-be-run tasks 1, 2, . . . , and m is determined, a task to be run next time is determined and a next running time T′ of the system is figured out according to T′=Ts+Fs, and ④ is performed;

④ The system is switched into a dormant state, and ⑤ is performed; and

⑤ The system is switched into an awake state when the current time of the system reaches the next running time T′ of the system, the corresponding task is run, and ① is repeated.

Wherein, the task to be turn next time is equivalent to a task to be run when the next preset running time of the task reaches the next running time of the system, when the current time of the system reaches the next running time T′.

Furthermore, the preset detection algorithm at least includes a peak detection algorithm and a dynamic threshold detection algorithm;

The peak detection algorithm includes:

① Acceleration data sequentially output by the acceleration sensor within a time period s is obtained, wherein the acceleration data includes an x-axis acceleration, a y-axis acceleration, and a z-axis acceleration; and ② is performed;

② Whether or not the sampling frequency of the acceleration sensor is greater than a preset sampling frequency is determined; if yes, ④ is performed; or, if not, ③ is performed;

③ $f(t)=\sqrt{(x_t-x_{t-1})^2+(y_t-y_{t-1})^2+(z_t-z_{t-1})^2}$ . . . (t≥1) is calculated, wherein f(t) represents the amplitude of a $t^{th}$ piece of acceleration data within the time period s, x(t) represents an x-axis acceleration corresponding to the $t^{th}$ piece of acceleration data, y(t) represents a y-axis acceleration corresponding to the $t^{th}$ piece of acceleration data, z(t) represents a z-axis acceleration corresponding to the $t^{th}$ piece of acceleration data, x(t−1) represents an x-axis acceleration corresponding to a $(t-1)^{th}$ piece of acceleration data, y(t−1) represents a y-axis acceleration corresponding to the $(t-1)^{th}$ piece of acceleration data, z(t−1) represents a z-axis acceleration corresponding to the $(t-1)^{th}$ piece of acceleration data, t represents the sequence of the acceleration data within the time period s; and ⑤ is performed;

$$f(t) = \begin{cases} \sqrt{(x_t - x_{t-2})^2 + (y_t - y_{t-2})^2 + (z_t - z_{t-2})^2} & \ldots (t = 2n, n \geq 1) \\ \sqrt{(x_t - x_{t-2})^2 + (y_t - y_{t-2})^2 + (z_t - z_{t-2})^2} & \ldots (t = 2m+1, n \geq 1) \end{cases} \quad (4)$$

is calculated, wherein f(t) represents the amplitude of the $t^{th}$ piece of acceleration data within the time period s, x(t) represents the x-axis acceleration corresponding to the $t^{th}$ piece of acceleration data, y(t) represents the y-axis acceleration corresponding to the $t^{th}$ piece of acceleration data, z(t) represents the z-axis acceleration corresponding to the $t^{th}$ piece of acceleration data, x(t-2) represents an x-axis acceleration corresponding to a $(t-2)^{th}$ piece of acceleration data, y(t-2) represents a y-axis acceleration corresponding to the $(t-2)^{th}$ piece of acceleration data, z(t-2) represents a z-axis acceleration corresponding to the $(t-2)^{th}$ piece of acceleration data, t represents the sequence of the acceleration data within the time period s; and ⑤ is performed;

⑤ An average value $$F(s) = \frac{1}{T} \sum_{1}^{T} f(t)$$

of the amplitudes of all the acceleration data within the time period s is obtained, wherein T represents the quantity of the acceleration data within the time period s; and ⑥ is performed; and ⑥ The average value F(s) of the amplitudes of all the acceleration data within the time period s is compared with a preset value, and whether or not the user falls at present is determined according to a comparison result;

The dynamic threshold detection algorithm includes:

I: Acceleration data sequentially output by the acceleration sensor is obtained, wherein the acceleration data includes an x-axis acceleration, a y-axis acceleration, and a z-axis acceleration; and II is performed;

II: When N pieces of acceleration data are obtained, an average value of the pieces N of acceleration data is calculated and is used as a dynamic threshold, and III is performed;

III: Acceleration data obtained every time after the dynamic threshold is worked out is compared with the dynamic threshold, and whether or not the user steps is determined according to a comparison result, and IV is performed; and IV: An average value of N pieces of acceleration data obtained after the dynamic threshold is worked out is recalculated, the dynamic threshold is updated, and step III is repeated.

Furthermore, original sampling data output by the sensors is saved by the processing module to be directly used as the sensor data, or data obtained after the original sampling data output by the sensors is processed through a preset processing method is saved by the processing module to be used as the sensor data, wherein the preset processing method at least includes a first processing method, a second processing method and a third processing method; different processing methods correspond to the different modes of the sensing device 1, and the user selects the preset pressing method by setting the mode of the sensing device 1; the first processing method includes:

$$\bar{x}_1 = \frac{1}{N} \sum_{i=1}^{N} x_i = \frac{x_1 + x_2 + x_3 + \ldots + x_N}{N},$$

$$\bar{x}_2 = \frac{1}{N} \sum_{i=N+1}^{2N} x_i = \frac{x_{N+1} + x_{N+2} + x_{N+3} + \ldots + x_{2N}}{N}, \ldots, \text{ and}$$

$$\bar{x}_N = \frac{1}{N} \sum_{i=(N-1)N}^{NN} x_i = \frac{x_{(N-1)N} + x_{(N-1)N+1} + \ldots + x_{NN}}{N}$$

are obtained, wherein $x_N$ represents original sampling data obtained by a $N^{th}$ time of sampling of the sensors, $x_{2N}$ represents original sampling data obtained by a $2N^{th}$ time of sampling of the sensors, and $x_{NN}$ represents original sampling data obtained by a $NN^{th}$ time of sampling of the sensors; the second processing method includes:

$$K_1 = \frac{x_{max1} - x_{min1}}{N} (x_{max1}, x_{min1} \in \{x_1, x_2, x_3, \ldots x_N\}),$$

$$K_2 = \frac{x_{max2} - x_{min2}}{N} (x_{max2}, x_{min2} \in \{x_{N+1}, x_{N+2}, x_{N+3}, \ldots x_{2N}\}), \ldots, \text{ and}$$

$$K_N = \frac{x_{maxN} - x_{minN}}{N} (x_{maxN}, x_{minN} \in \{x_{(N-1)N}, x_{(N-1)N+1} \ldots x_{NN}\})$$

are obtained, wherein $x_N$ represents original sampling data obtained by the $N^{th}$ time of sampling of the sensors, $x_{2N}$ represents original sampling data obtained by the $2N^{th}$ time of sampling of the sensors, $x_{NN}$ represents original sampling data obtained by the $NN^{th}$ time of sampling of the sensors, $x_{max1}$ represents the maximum value among original sampling data $x_1, x_2, x_3, \ldots x_N$ of the sensors, $x_{min1}$ represents the minimum value among original sampling data $x_1, x_2, x_3, \ldots x_N$ of the sensors, $x_{max2}$ represents the maximum value among original sampling data $x_{N+1}, x_{N+2}, x_{N+3}, \ldots x_{2N}$ of the sensors, $x_{min2}$ represents the minimum value among original sampling data $x_{N+1}, x_{N+2}, x_{N+3}, \ldots x_{2N}$ of the sensors, $x_{maxN}$ represents the maximum value among original sampling data $x_{(N-1)N}, x_{(N-1)N+1} \ldots x_{NN}$ of the sensors, and $x_{minN}$ represents the minimum value among original sampling data $x_{(N-1)N}, x_{(N-1)N+1} \ldots x_{NN}$ of the sensors; the third processing method includes: ① an average value and a variance of original sampling data of N sensors are calculated; and ② the statistic $$T_i = \frac{x_i - \bar{X}}{S}$$

(i=1, 2, . . . , and N) of the original sampling data of the N sensors are sequentially calculated; original sampling data $x_i$ meeting $T_i \geq T_{\alpha,n}$ of the corresponding sensor is rejected, and ① is repeated when original sampling data of N sensors are obtained again until the statistics of the original sampling data of all the sensors are calculated, wherein $\bar{X}$ represents the average value of the original sampling data of the N sensors, S represents the variance of the original sampling data of the N sensors, $x_i$ represents the original sampling data of the $i^{th}$ sensor, and $T_{\alpha,n}$ represents a critical value obtained with reference to the Grubbs Table; and the original sampling data of the sensors and the data obtained after the original sampling data of the sensors are processed through different processing methods are output in a data structural form including data information and data type information, and the original sampling data of the sensors and the different preset processing methods are distinguished according to different data type information. Furthermore, the sensing device 1 is provided with a voiceprint recognition device; the user broadcasts WIFI configuration information by means of voiceprints, and the voiceprint recognition device analyzes and recognizes the voiceprints and then converts the voiceprints into the corresponding WIFI configuration information; and the user controls one or more sensing devices 1 by means of voice through the voiceprint recognition device.

Furthermore, the wireless communication module is able to work in an AP mode and an STA mode, and the AP mode is configured through the following steps:

A1: The AP mode is enabled, and A2 is performed;

A2: Wait to obtain an IP, and A3 is performed;

A3: A TCP connection is established, and A4 is performed;

A4: The TCP connection is tracked, and A5 is performed;

A5: A TCP command is received, and A6 is performed;

A6: The type of the TCP command is determined, and A7 is performed;

A7: If the TCP command is an exit command or a configuration command, the TCP command is received, and A8 is performed; or, if the TCP command is a command for reading sensing device 1 information, sensor information, or error information, the TCP command is received, and A6 is repeated;

A8: An AP mode configuration result is sent, and A9 is performed;

A9: The TCP connection is turned off, and A10 is performed;

A10: The STA mode is configured, and A11 is performed; and

A11: Exit a configuration process of the AP mode.

Furthermore, the sensing device 1 is able to be connected to a user terminal, and the user implements the configuration process of the AP mode by means of the user terminal, and checks AP mode configuration information, the sensing device 1 information, the sensor information, and/or the error information via the user terminal. Furthermore, the sensing device 1 at least comprises a USB interface, a microusb interface, and/or a miniUSB interface and is connected to the user terminal via the USB interface; the user terminal is a mobile phone, a tablet computer, or a PC; and data saved in the sensing device 1 is guided into the user terminal via the USB interface.

A sensing system comprises plurality of intelligent sensing devices mentioned above and a data platform connected with the plurality of sensing devices 1.

The intelligent sensing device 1 of the invention is extremely low in power consumption, good in stability and sensitivity and high in storage capacity, can be interconnected with a data platform, and allows various sensors to be accessed thereto; and the sensing system is provided with one data platform and a plurality of sensing devices 1 interconnected with the data platform by means of WIFI wireless transmission, so that sensing data are synchronized into the data platform of the background Internet directly through the Internet by means of wireless WIFI, and users can obtain data transmitted from the sensing devices 1 anywhere in the world by visiting the Web browser via smartphones or computers. Power consumption can be minimized while the maximum transmission distance and functions are fulfilled in use. By adoption of the scheduling intermittent sleeping algorithm, power consumption can be effectively reduced, data acquisition efficiency can be effectively improved, and the reliability and accuracy of data are guaranteed.

Figure 3:
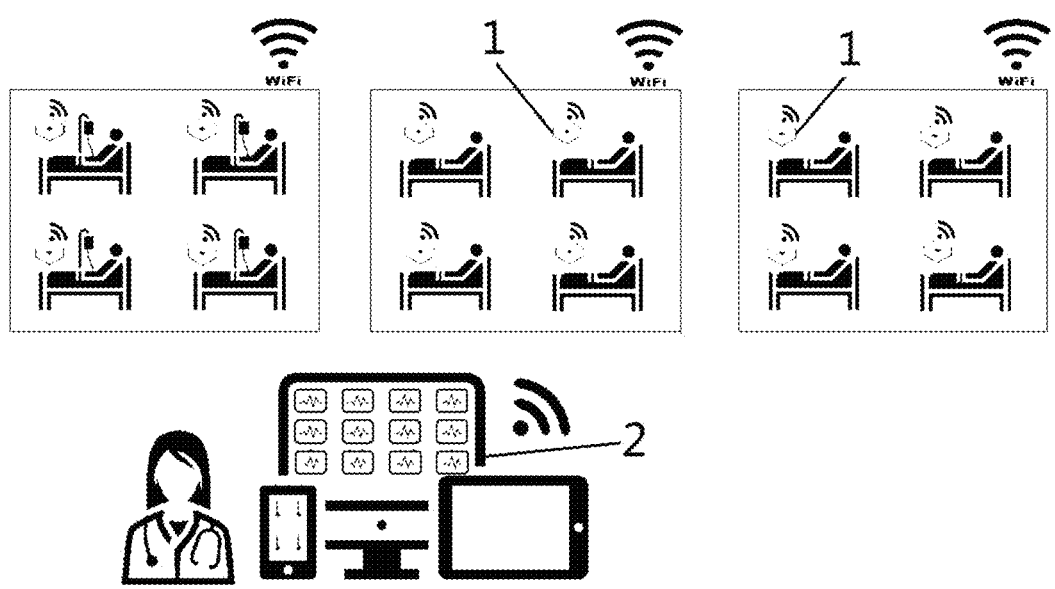
FIG. 3 is an application diagram of the sensing system of the invention.
Figure 4:
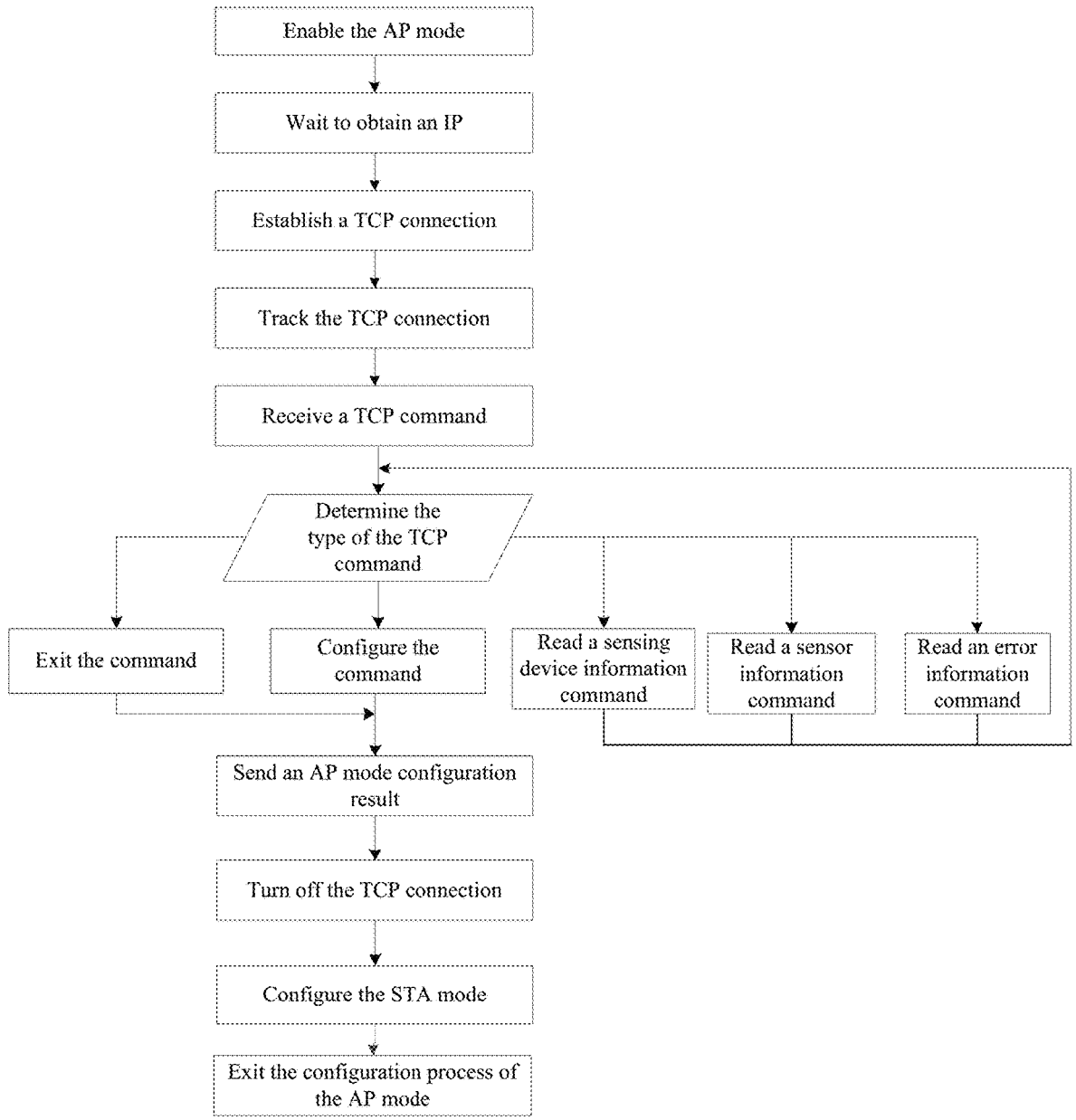
FIG. 4 is a flow diagram for AP mode configuration of a sensing device of the invention.

Many sensing devices 1 on the current market cannot cache a large quantity of sensor data, and data may be lost when the transmission network has a problem. The memory module of the invention can be a 16 MB memory chip which is able to save 285,000 pieces of data, namely data of more than one year, in combination with a typical storage mode of the invention, and can still be used for a long time in the absence of a WIFI network. The processing module saves received sensor data output by the sensor unit by means of memory structures, and each memory structure saves a plurality of pieces of data separated by separators, each piece of data includes sensor data and corresponding sensor data reception timestamp information and sensor type information, and the source of each piece of sensor data can be effectively tracked according to the sensor data reception timestamp information. The processing module is internally provided with the real-time operating system (RTOS), so that sensor data can be acquired, saved, calculated and synchronized in real time without mutual interference. The clock of the sensing device 1 is kept synchronous with the clock of the data platform, so that the accuracy of time is guaranteed. The sensing device 1 of the invention has various different modes corresponding to different preset detection algorithms and different processing methods for original sampling data of the sensors, so that the sensing device 1 can better meet user requirements and can better adapt to usage scenes, thus, improving user experience. CRC is carried out on the sensor data, so that the accuracy and integrity of transmitted data are guaranteed. When needing to upload the data stream or the sensor data to the data platform, the processing module establishes a WIFI connection through the wireless communication module first; when the WIFI connection succeeds, the processing module reads the to-be-uploaded data stream or sensor data; if the to-be-uploaded data stream or sensor data is successfully read by the processing module, the sensing device 1 is connected to the data platform, and the processing module runs a watchdog monitoring program at the same time to monitor the operating state of the system in real time, so that program deviation caused by interference from an external electromagnetic field or manual interference is prevented, which may otherwise cause a drop-dead halt and a standstill of the whole system. The sensing device 1 at least comprises a USB interface, a microusb interface, and/or a miniUSB interface and is connected to the user terminal via the USB interface; the user terminal is a mobile phone, a tablet computer, or a PC; the user configures the AP mode by means of the user terminal, for instance, by sending a WIFI SSID or password to the sensing device 1, by changing the serial number of the device or by performing other related setting operation, and checks AP mode configuration information, sensing device 1 information, sensor information, and/or error information via the user terminal; and data saved in the sensing device 1 can be directly guided into the user terminal via the USB interface to generate an Excel form which is in turn saved in a corresponding path. The sensing device 1 of the invention is provided with the voiceprint recognition device, the user broadcasts WIFI configuration information by means of voiceprints, and the voiceprint recognition device analyzes and recognizes the voiceprints and then converts the voiceprints into the corresponding WIFI configuration information; and the user controls one or more sensing devices 1 by means of voice through the voiceprint recognition device, so that data transmission safety and convenience are improved to a great extent, and the implementation of group broadcasting further improves the data transmission convenience, the configuration time is saved, and convenience is brought to users. FIG. 3 shows an application diagram of the sensing system of the invention. As shown in FIG. 3, in actual application, the data platform can be connected with a plurality of user access terminals 2, and users visit the data platform via the user access terminals 2 to obtain data transmitted from the sensing device 1 in real time everywhere in the world by visiting the Web browser by means of smartphones or computers.

The sensing device 1 of the invention not only can transmit complete original sampling data, but also can provide various data processing and calculating methods and data output methods, thus, reducing the network data transmission quantity, reducing power consumption, and improving calculation efficiency.

CRC of data is implemented as follows:

```
Data_CheckCrc(uint8_t *data,uint8_t bytes)
 1. // data: represents each sensor value to be checked
 2. // bytes: represents the number of bytes of each value to be checked
 3. uint8_t byte, crc=0xff; // initialize the parameter
 4. for(byte=0;byte<bytes;byte++)
 5. for(bit=0;bit<8;bit++)//sequentially read check values by byte and bit
 6. crc=(crc<<1)^polynomial; //finally obtain a check code, and write the check
code into crc
 7. ... ... //update other data operation types and parameters
 8. return crc;// complete check, and return the check code
```

The processing module of the invention carries out CRC on the sensor data as follows:

```
SingleShotMeasure(float *data1,float * data2, float *...)
 1. * data1 =ERROR_CODE; * data2 =ERROR_CODE;//set the initial value to
an error state
 2. set recive [ ];data1,data2...;//initialize the parameter
 3. // recive [ ] represents received data
 4. // data1,data2: represent two values to be checked
 5. Single_Start( );//start data transmission, transmit high-order MSB, and then
transmit low-order LSB
 6. flag= CheckCrc(&recive[ ],n); //check received recive values, and save a result
in flag
 7. if(flag)//judge the flag
 8. //if check is OK, change returned values of *data1 and *data2 into received
values
 9. *data1=ERROR_CODE; *data2=ERROR_CODE; //return an error if check is
not OK
 10. Single_Stop( );//End data transmission, and return a read value
```

An illustrative application of the memory structures of the invention is given below, wherein TIME represents the creation time of the memory structures; $time_1$, $time_2$ and $time_3$ represent sensor data reception timestamp information, for instance, "2015-12-17T18:16:22Z"; SensorName represents sensor type information; $data_1$, $data_2$ and $data_3$ represent the sensor data; ! represents the separator; through the configuration of the separators, data conversion is not needed anymore when the data stream is uploaded, thus, improving the efficiency and guaranteeing the accuracy.

Illustrative Application of the Memory Structures:

```
{ { TIME : time₁ , SensorName : data₁ }!
  { TIME : time₂ , SensorName : data₂ }!
  { TIME : time₃ , SensorName : data₃ }!
  ......}
```

Figure 9:
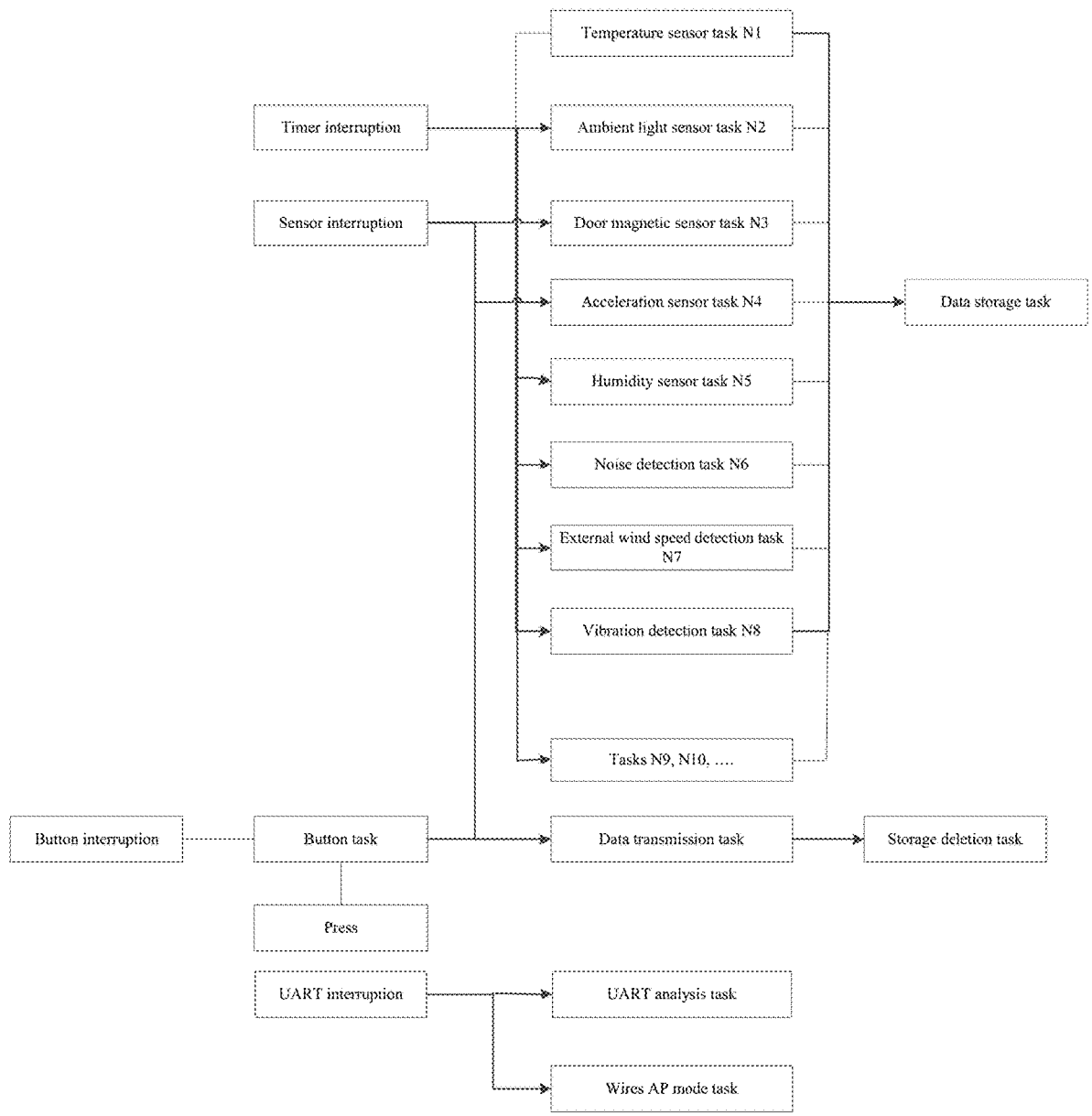
FIG. 9 is an application diagram of a real-time operating system (RTOS) of the invention.

The processing module of the invention is internally provided with the RTOS, so that instruction of the system can be switched among multiple tasks by means of interrupt flags of the RTOS and can be directly switched to the task program without a time-consuming and complex useless intermediate program, thus, improving the sensitivity of the device to a great extent. The specific application of the RTOS is illustratively described below, wherein FIG. 9 shows an illustrative application diagram of the RTOS of the invention.

Illustrative Application of the RTOS:

```
    1. OsiSyncObj_t  xBinary1;   //For Button interrupt task//define a flag of a
button interrupt sub-program
    2. OsiSyncObj_t  xBinary2;   //For Temperature Sensor Task//define a flag of a
temperature sensor sub-program
    3. OsiSyncObj_t  xBinary3;   //For Light Sensor Task//define a flag of an
acceleration sensor sub-program
    4. ... ...;//define flags of other sub-programs
    5. osi_SyncObjSignalFromISR(&xBinary1); //use the flag of the button interrupt
sub-program in the program
    6. osi_SyncObjWait(&xBinary1,OSI_WAIT_FOREVER);//wait for the flag of the
button interrupt sub-program at a certain position of the program, and execute the next command
once the flag is recognized
    7. OsiSyncObj_t  xMutex1;   //Used for SPI Lock//define a lock flag of the SPI
sub-program
    8. OsiSyncObj_t  xMutex2;   //Used for SimpleLink Lock//define a lock flag of
the SimpleLink sub-program
    9. ... ...;//define lock flags of other sub-programs
    10. osi_SyncObjWait(&xMutex0,OSI_WAIT_FOREVER);
    11.  osi_SyncObjSignal(&xMutex0); lock the currently-executed program to
prevent conflictions between tasks
    12. OsiMsgQ_t  xQueue0;   //Used for cjson and memory save//define a cache
queue
    13. OsiMsgQ_t  xQueue1;   //Used for LED control task//
    14. ... ...;//define other queues
    15. osi_MsgQWrite(&xQueue0,&st,OSI_NO_WAIT);//write memory structure
information into the queue
    16.  osi_MsgQRead(&xQueue0,&st,OSI_WAIT_FOREVER);  //---Wait  &st
Message---//wait to read the memory structure information in the queue
``` of the invention. In actual application, the processing module can be a processor, the memory module can be a memory circuit, the mode selection switch is used by the user to select the mode of the sensing device 1, and the voltage conversion module, the USB interface conversion module, the clock module, and the voltage stabilizing module separately correspond to a voltage conversion circuit, a USB interface conversion circuit, a clock circuit, and a voltage stabilizing circuit. In this invention, the AD sampling circuit comprises a first division resistor and a second division resistor which are connected in series, wherein one terminal of the second division resistor is grounded when the AD sampling circuit carries out sampling and is not grounded when the AD sampling circuit does not carry out sampling; one terminal of the first division resistor is connected with an positive pole of a power supply, and the other terminal of the first division resistor is connected with the second division resistor; the other terminal of the second division resistor is connected with an IO interface of the processor and can be controlled to be grounded or not to be grounded by controlling the IO interface of the processor to be grounded or not grounded, so that this terminal is grounded only when sampling is carried out; and this terminal is suspended or pulled upwards after sampling is completed, so that current losses caused by direct grounding of the division resistors are avoided, and power consumption is reduced to a great extent.

Figure 5:
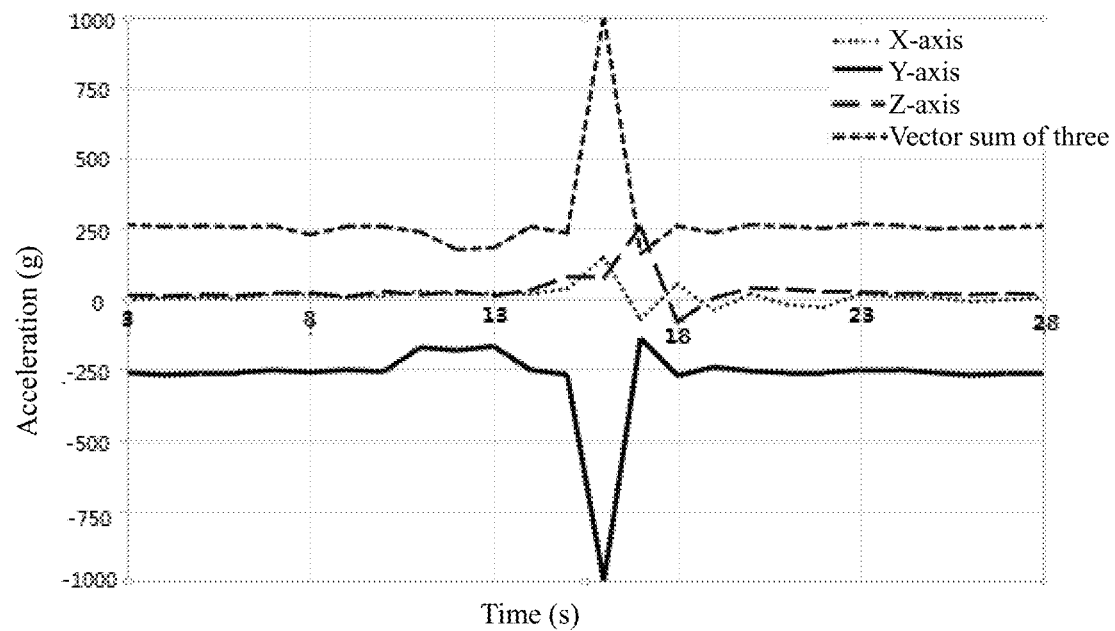
FIG. 5 is a curve chart of the variation with time of output data of an acceleration sensor of the invention for a suddenly-impacted object.
Figure 6:
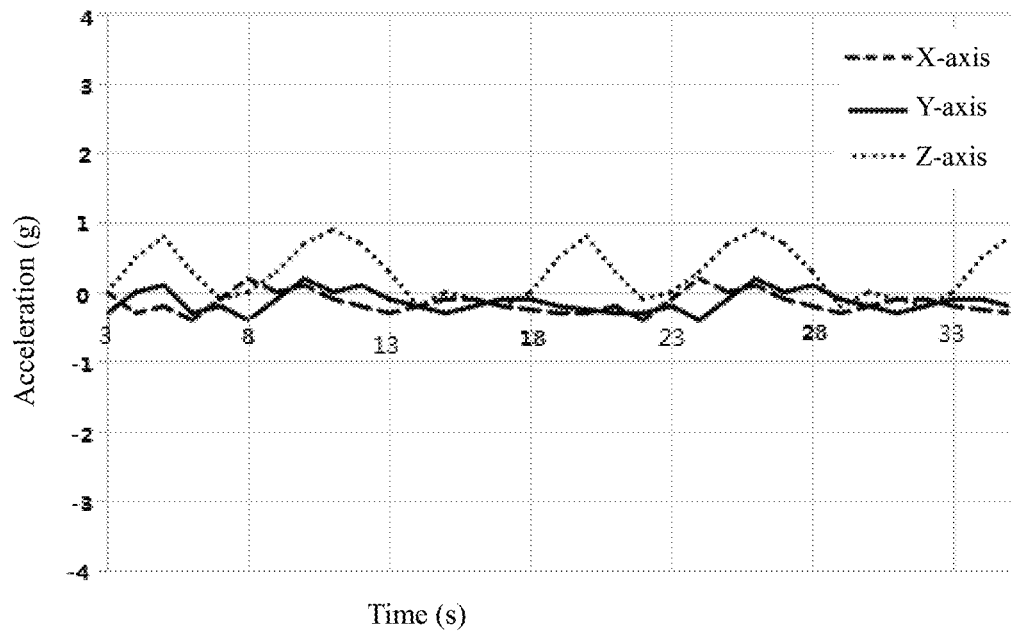
FIG. 6 is a curve chart of the variation with time of output data of the acceleration sensor of the invention for a slowly-moving object.

FIG. 5 shows a curve chart of the variation with time of output data of the acceleration sensor of the invention for a suddenly-impacted object, and FIG. 6 shows curve chart of the variation with time of output data of the acceleration sensor of the invention for a slowly-moving object. For the suddenly-impacted object or the slowly-moving object, it is necessary to adopt different preset detection algorithms, such as the peak detection algorithm and the dynamic threshold algorithm, to accurately detect the motion state of the object. The wireless communication module of the invention comprises a WIFI chip, so that the technical problems that most peripheral functional circuits around a main chip of a traditional WIFI module are useless for the sensing device 1, only a small part of circuits serve the sensing device 1, power requirements of products cannot be met, and extra unnecessary power consumption is generated can be solved directly by a chip-level solution.

When needing to upload the data stream or the sensor data to the data platform, the processing module establishes a WIFI connection through the wireless communication module first; when the WIFI connection succeeds, the processing module reads the to-be-uploaded data stream or sensor data; if the to-be-uploaded data stream or sensor data is successfully read by the processing module, the sensing device 1 is connected to the data platform, and the processing module runs a watchdog monitoring program at the same time. A corresponding feasible implementation process during actual application is given below:

```
DataPostTask(void *pvParameters)
    1. Start
    2. Int    lRetVal Initialize the parameter
    3. WlanConnect( )//Establish a WIFI connection once data are detected, and save a
returned result into lRetVal
    4. if(lRetVal )//read lRetVal; if lRetVal=1, it indicates that the WIFI connection
succeeds
    5. //WIFI In the case of a successful WIFI connection, read data length len, and
save a returned result into lRetVal
```

Figure 7:
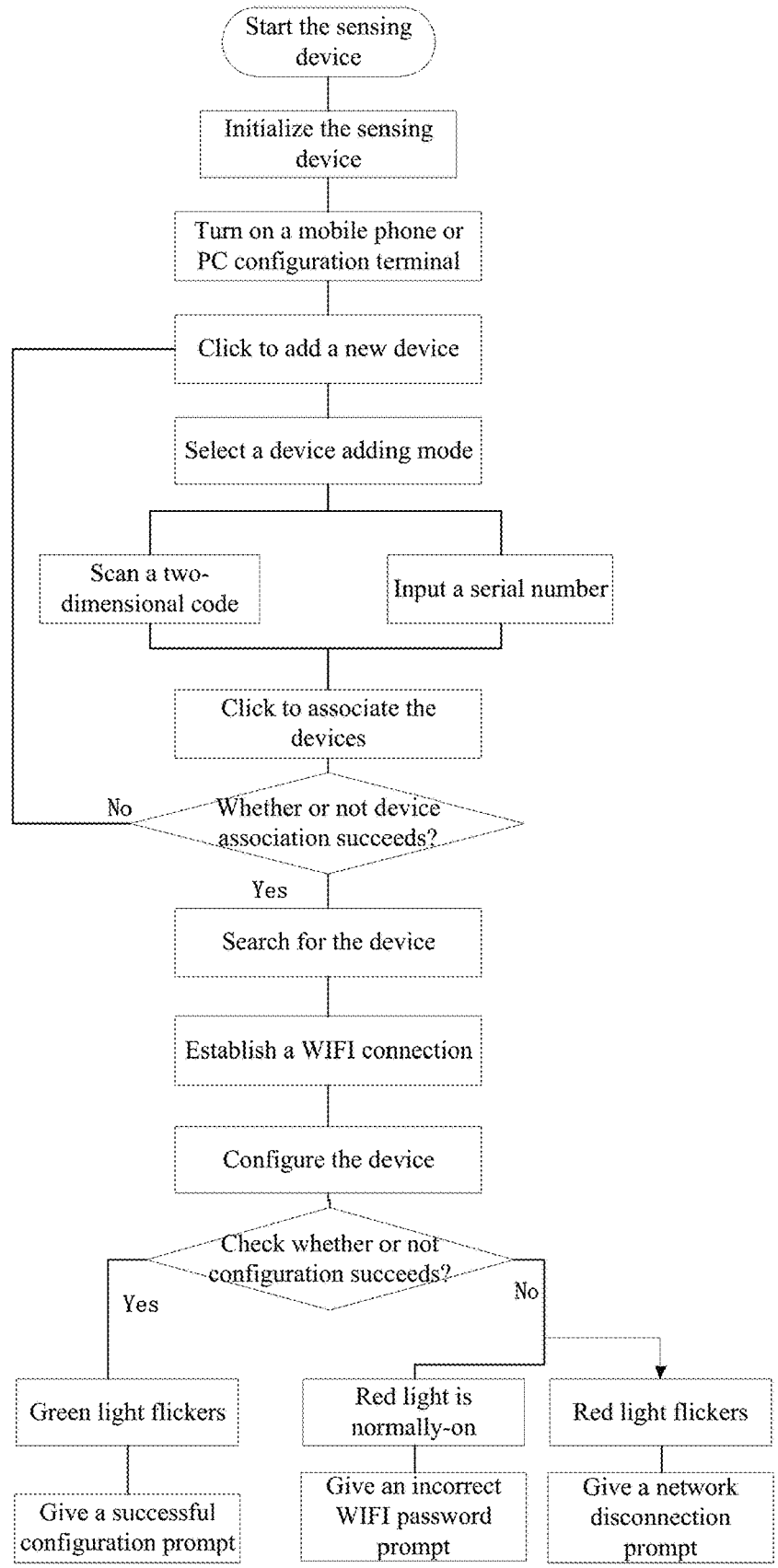
FIG. 7 is a flow diagram for wireless configuration operation of the sensing device by a user by means of a mobile phone or a PC.

6. if(lRetVal )//Read lRetVal again; if lRetVal=1, it indicates that data is successfully read
7. ConnectToHTTPServer(&httpClient)//In the case where data are successfully read, establish a connection to HTTP server
8. WatchdogAck( ); run the watchdog program, once the program deviates, the connection fails, and the system resets automatically.
9. HTTPPostMethod( );// transmit data to HTTP
10. HTTPCli_disconnect( );//turn off the HTTP connection after data transmission is completed
11. WlanStop( )//turn off the WIFI connection By adoption of the sensing device 1 of the invention, users can carry out wireless configuration via a mobile phone or a PC and check the current configuration information of the sensing device 1, information read by the sensors, and error information via a configuration interface of the mobile phone or PC. FIG. 7 shows flow diagram for wireless configuration of the sensing device 1 by users through the mobile phone or PC. The specific process is as follows:

B1: Start the sensing device 1;
B2: Initial the sensing device 1;
B3: Turn on a mobile phone or PC configuration terminal;
B4: Click to add a new device;
B5: Select a device adding mode, wherein the device adding mode includes two-dimensional code scanning or series number input;
B6: Click to associate the devices;
B7: Determine whether or not association succeeds; if yes, perform B8; or if not, return to B4:
B8: Search for the device;
B9: Establish a WIFI connection;
B10: Configure the device; and
B11: Check whether or not configuration succeeds; if yes, the green light flicks to give a successful configuration prompt; or if not, the red light is normally on to give an incorrect WIFI password prompt or flicks to give a network disconnection prompt.

Figure 8:
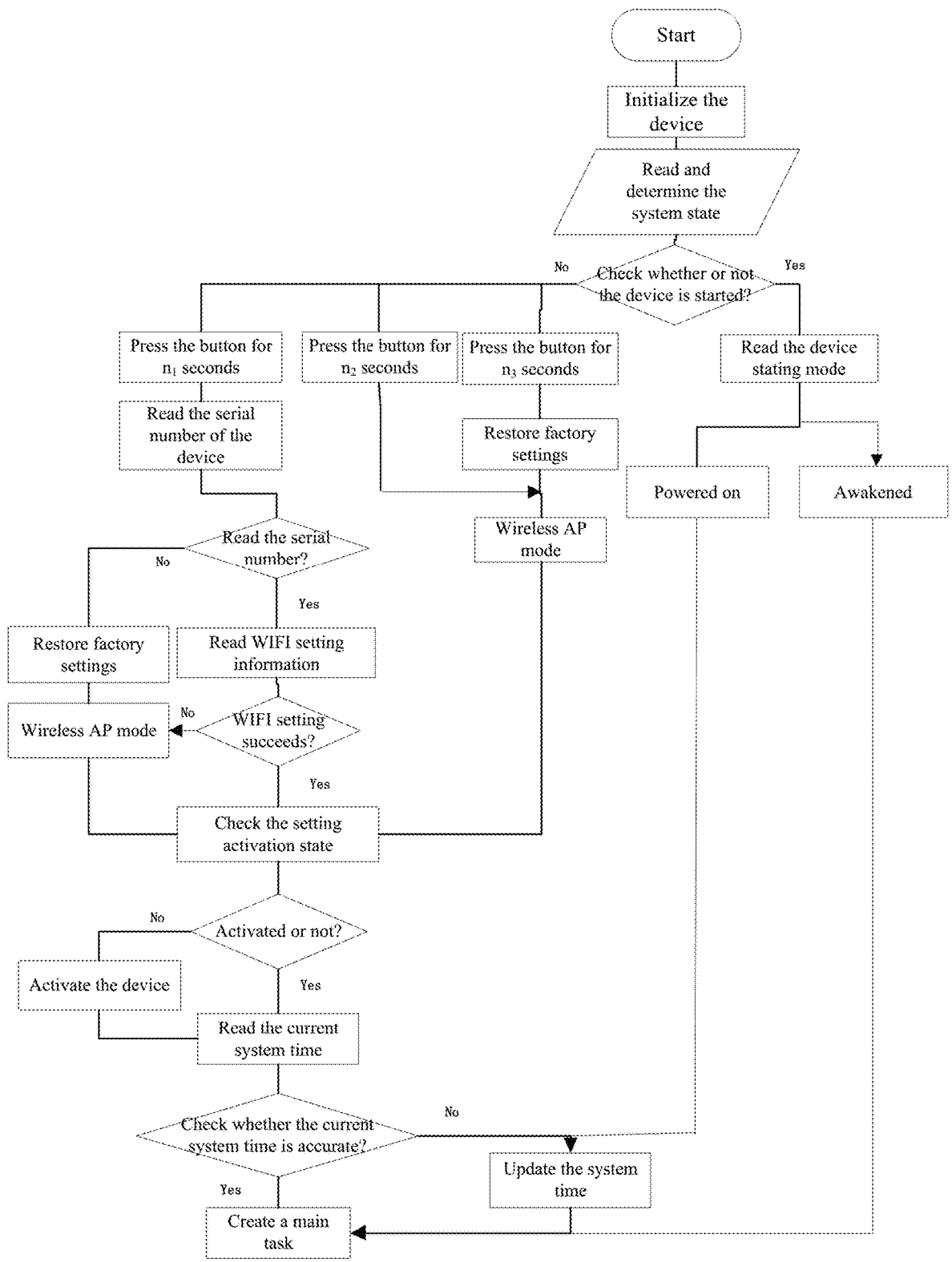
FIG. 8 is an illustrative flow diagram when a main task is created after the sensing device is started.

FIG. 8 shows an illustrative flow diagram when a main task is created after the sensing device 1 is started. As shown in FIG. 8, in actual application, the process of creating a main task after the sensing device 1 is started is as follows:

C1: Start;
C2: Initialize the device;
C3: Read and determine the system state;
C4: Check whether the device is in an on state; if yes, perform C5; or if not, perform C6;
C5: Read the starting mode of the device; if the device is powered on, update the system time and perform C14; or if the device is awakened, perform C14;
C6: Recognize the button state; if the button is pressed for n1 seconds, read the serial number of the device, and perform C7; or, if the button is pressed for n2 seconds, enter into the wireless AP mode, and perform C7; or, the button is pressed for n3 seconds, restore factory settings, and perform C9;
C7: Determine whether or not the serial number is read; if yes, read WIFI setting information, and perform C8; or if not, restore factory settings, and perform C9;
C8: Check whether WIFI is successfully set; if yes, perform C10; or if not, perform C9;
C9: Enable the wireless AP mode, and perform C10;
C10: Check the setting activation state;
C11: Determine whether the setting is activated; if yes, perform C12; or if not, activate the setting, and perform C12;
C12: Read the current system time;
C13: Determine whether or not the current system time is accurate; if yes, perform C14; or if not, update the system time, and then perform C14; and
C14: Create a main task.

Due to the fact that the preset next running times T1, T2, T3, . . . , and Tm of the current to-be-run tasks 1, 2, . . . , and m are variable, an intelligent scheduling intermittent sleeping algorithm is adopted when the system runs tasks. Particularly, the average value F(s) of the amplitudes of all acceleration data within the time period s is compared with a preset value, whether or not the user falls at present is determined according to a comparison result, and if F(s) is greater than the preset value, it is determined that the user falls at present; acceleration data obtained every time after a dynamic threshold is worked out is compared with the dynamic threshold, whether or not the user steps is determined according to a comparison result, and if the acceleration data is greater than the dynamic threshold, it is determined that the user steps. In the invention, "a plurality of" refers to two or more. Data obtained after the original sampling data of the sensors is processed through a first processing method includes: $\bar{x}_1, \bar{x}_2, \ldots,$ and $\bar{x}_N$, wherein $$\bar{x}_1 = \frac{1}{N}\sum_{i=1}^{N} x_i = \frac{x_1 + x_2 + x_3 + \ldots + x_N}{N},$$

$$\bar{x}_2 = \frac{1}{N}\sum_{i=N+1}^{2N} x_i = \frac{x_{N+1} + x_{N+2} + x_{N+3} + \ldots + x_{2N}}{N}, \ldots, \text{ and}$$

$$\bar{x}_N = \frac{1}{N}\sum_{i=(N-1)N}^{NN} x_i = \frac{x_{(N-1)N} + x_{(N-1)N+1} + \ldots + x_{NN}}{N},$$

$x_1$ represents original sampling data obtained by the $1^{st}$ time of sampling of the sensors, $x_2$ represents original sampling data obtained by the $2^{nd}$ time of sampling of the sensors, $x_3$ represents the original sampling data obtained by the $3^{rd}$ time of sampling of the sensors, $x_{N+1}$ represents the original sampling data obtained by the $(N+1)^{th}$ time of sampling of the sensors, $x_{N+2}$ represents the original sampling data obtained by the $(N+2)^{th}$ time of sampling of the sensors, $x_{N+3}$ represents the original sampling data obtained by the $(N+3)^{th}$ time of sampling of the sensors, $x_{(N-1)N}$ represents the original sampling data obtained by the $((N-1)N)^{th}$ time of sampling of the sensors, and $x_{(N-1)N+1}$ represents the original sampling data obtained by the $((N-1)N+1)^{th}$ time of sampling of the sensors. Data obtained after the original sampling data of the sensors is processed through a second processing method includes $K_1, K_2, \ldots,$ and $K_N$. The statistics corresponding to data obtained after the original sampling data of the sensors is processed through a third processing method are all smaller than $T_{\alpha,n}$ of the original sampling data of the sensors, wherein $T_{\alpha,n}$ is a critical value obtained with reference to the Grubbs Table, and in actual application, $T_{\alpha,n}$ is obtained according to a preset critical condition and N with reference to the Grubbs Table. The clock of the sensing device 1 is kept synchronous with the clock of the data platform in such a manner: a corresponding clock calibration mechanism synchronizes the clock of the sensing device 1 and the clock of the data platform according to a preset synchronization cycle, or clock synchronization is carried out when the sensing device uploads data to the data platform. The processing module directly uploads corresponding sensor data to the data platform according to preset interrupt information received, wherein the preset interrupt information is generated according to data output of specific sensors. For instance, the corresponding interrupt information is generated when the vibration sensor outputs data, and the processing module uploads data output by the vibration sensor to the data platform according to this interrupt information.

The sensing device 1 of the invention is extremely low in power consumption, long in battery life and high in sensitivity. In actual application, the sensing device 1 can be designed to be small, light and thin so as to be attached to almost any products. Furthermore, the sensing device 1 directly synchronizes specific state data of the object attached with the sensing device or the environment around the object into the data platform by means of wireless WIFI so that any object can easily have access to the Internet. By means of the combination of multi-dimensional data, the sensing device can be widely applied to industrial engineering, animal husbandry, farming, mechanical production, medical treatment, logistics, and the like to fulfill environmental monitoring, judgment, analysis, control, early warning and prompting. The development of the environmental sensing technology promotes the progress of wearable equipments and also brings more expectations to people in the medical field. The sensing device 1 of the invention can be applied to the medical industry. Particularly, physical sign data of human bodies can be acquired through the intelligent sensing device and are then transmitted to family members of patients and medical staff by means of wireless WIFI, so as to form a complete medical monitoring ecological system; through the configuration of a plurality of intelligent sensing devices, the body temperature and rest conditions, such as the sleep condition, the noise conditions, the ambient temperature and humidity, and the light condition, of patients in a ward can be detected in real time; acquired data are synchronized into a data platform after being subjected to individual anomaly judgment and being analyzed and processed, so that doctors and nurses on duty can pay close attention to the health condition of all the patients; and when the data exceeds a preset threshold or range, an alarm is given to medical staff. Patients suffering from certain chronic diseases, long-term diseases or latent diseases have to be hospitalized for observation to record data, and long-term data are collected and summarized and then are informed to the attending doctor to make a definite diagnosis. In this case, the patients have to pay high hospitalization expenses and bear high mental stress before the final definite diagnosis due to the fact that there are generally no obvious signs before the deterioration of certain fatal diseases such as cancers. By adoption of the sensing device 1 of the invention, certain physical data of the patients can be recorded in time and can be transmitted by means of the Internet to related medical professionals to be analyzed, and thus, latent diseases can be found and treated as early as possible without affecting the normal life of the patients. The sensing device 1 of the invention can also be applied to the logistics industry. Particularly, it is impossible for customers to know whether or not the temperature of goods, particularly cold-chain goods, meets the standards in the whole transportation process during logistics, and due to the presence of severe bumping and vibrations in the transportation process, the service life of the logistics transportation providers cannot be accurately evaluated by SLA and can only be verified by checking goods one by one after the goods are unpacked at the destination. By configuring the sensing device 1 of the invention into goods, temperature, humidity, brightness and vibration changes and other environmental changes of the goods can be accurately acquired at each time point in the whole transportation process, so that the service level of the logistics transportation providers is monitored, and inspection of logistics customers and evaluation of the wastage of the goods are facilitated; and valid data can be provided as evidence in a case of a dispute, and liability risks of goods owners in the aspects of transportation and delivery can be reduced. The sensing system of the invention adopts an intelligent scheduling intermittent sleeping mode, and two 7 # or 5 # batteries can continuously supply power to the sensing system for over half a year, thus, completing meeting long-distance transportation requirements.

The above embodiments are only preferred ones of the invention, and are not intended to limit the protection scope of the invention. All equivalent substitutes or transformations obtained by any skilled in the art on the basis of the technical solutions and concept of the invention within the technical scope should also fall within the protection scope of the invention.

What is claimed is:

1. An intelligent sensing device, comprising a sensor unit provided with a plurality of sensors, a wireless communication module connected with a data platform, a memory module and a processing module, wherein the processing module is connected with the sensor unit, the wireless communication module and the memory module;

the sensor unit includes at least two of a temperature sensor, a humidity sensor, an ambient light sensor, a magnetic field sensor, an acceleration sensor and a vibration sensor, and the wireless communication module at least includes a WIFI chip; and the processing module acquires a motion condition of a user by means of a preset detection algorithm according to a detection result of the acceleration sensor; and the sensing device has multiple different modes corresponding to different preset detection algorithms, and the user selects the preset detection algorithm by setting the mode of the sensing device;

wherein the processing module operates or sleeps according to an intelligent scheduling intermittent sleeping algorithm;

wherein, the intelligent scheduling intermittent sleeping algorithm includes:

① acquiring a current time Ts of a system and preset next running times T1, T2, T3, . . . , and Tm of current to-be-run tasks 1, 2, . . . , and m, and performing ②;

② sequentially working out execution frequencies F1, F2, F3, . . . , and Fm of the current to-be-run tasks 1, 2, . . . , and m, wherein F1=T1−Ts, F2=T2−Ts, F3=T3−Ts, . . . , and Fm=Tm−Ts; and performing ③;

③ determining a minimum value Fs among the execution frequencies F1, F2, F3, . . . , and Fm of the current to-be-run tasks 1, 2, . . . , and m, determining a task to be run next time and figuring out a next running time T´ of the system according to T´=Ts+Fs, and performing ④;

④ switching the system into a dormant state, and performing ⑤; and
⑤ switching the system into an awake state when the current time of the system reaches the next running time T´ of the system, running the corresponding task, and returning to ①.

2. The intelligent sensing device according to claim 1, wherein:
the sensor unit further includes at least one of a wind speed sensor, a pH sensor, a light intensity sensor, a dissolved oxygen sensor, a carbon dioxide sensor, an air quality sensor, a door magnetic sensor and a noise sensor; and
the sensing device further comprises a USB interface conversion module, a mode conversion switch, a voltage conversion module, a voltage stabilizing module and a clock module which are connected with the processing module.

3. The intelligent sensing device according to claim 1, wherein the processing module saves received sensor data output by the sensor unit by means of memory structures, each said memory structure contains a plurality of pieces of data which are separated by separators, and each said piece of data includes sensor data and corresponding sensor data reception timestamp information and sensor type information; the processing module sequentially arrays the memory structures in a creation sequence to form a data stream which is uploaded to the data platform according to a preset upload cycle; and the processing module directly uploads the corresponding sensor data to the data platform according to preset interrupt information received.

4. The intelligent sensing device according to claim 3, wherein before saving the received sensor data output by the sensor unit, the processing module carries out CRC (Cyclic Redundancy Check) on the sensor data, saves sensor data passing CRC, and reads CRC error values corresponding to sensor data not passing CRC.

5. The intelligent sensing device according to claim 3, wherein:
after the data stream or the sensor data is uploaded to the data platform, the processing module deletes corresponding data saved in the sensing device;
when needing to upload the data stream or the sensor data to the data platform, the processing module establishes a WIFI connection through the wireless communication module first; when the WIFI connection succeeds, the processing module reads the to-be-uploaded data stream or sensor data; if the to-be-uploaded data stream or sensor data is successfully read by the processing module, the sensing device is connected to the data platform, and the processing module runs a watchdog monitoring program at the same time; and
the data platform is able to send instructions to the sensing device, and the sensing device sends operation information for deleting all instruction queues to the data platform so as to refuse to receive new instructions.

6. The intelligent sensing device according to claim 1, wherein:
a clock of the sensing device is kept synchronous with a clock of the data platform;
the processing module is internally provided with a real-time operating system (RTOS); and
the processing module is a processor integrally provided with an AD (Analog to Digital) sampling circuit, wherein the AD sampling circuit includes a first division resistor and a second division resistor which are connected in series, and one terminal of the second division resistor is grounded when the AD sampling circuit carries out sampling and is not grounded when the AD sampling circuit does not carry out sampling.

7. The intelligent sensing device according to claim 1, wherein the preset detection algorithm at least includes a peak detection algorithm and a dynamic threshold detection algorithm;
the peak detection algorithm includes:
① Obtaining acceleration data sequentially output by the acceleration sensor within a time period s, wherein the acceleration data includes an x-axis acceleration, a y-axis acceleration, and a z-axis acceleration; and performing ②;
② Determining whether or not a sampling frequency of the acceleration sensor is greater than a preset sampling frequency; if yes, performing ④; or, if not, performing ③;
③ Calculating $f(t)=\sqrt{(x_t-x_{t-1})^2+(y_t-y_{t-1})^2+(z_t-z_{t-1})^2}$ ... ($t \geq 1$), wherein f(t) represents an amplitude of a $t^{th}$ piece of acceleration data within the time period s, x(t) represents an x-axis acceleration corresponding to the $t^{th}$ piece of acceleration data, y(t) represents a y-axis acceleration corresponding to the $t^{th}$ piece of acceleration data, z(t) represents a z-axis acceleration corresponding to the $t^{th}$ piece of acceleration data, x(t−1) represents an x-axis acceleration corresponding to a $(t-1)^{th}$ piece of acceleration data, y(t−1) represents a y-axis acceleration corresponding to the $(t-1)^{th}$ piece of acceleration data, z(t−1) represents a z-axis acceleration corresponding to the $(t-1)^{th}$ piece of acceleration data, t represents a sequence of the acceleration data within the time period s; and performing ⑤;
④ Calculating $$f(t) = \begin{cases} \sqrt{(x_t-x_{t-2})^2+(y_t-y_{t-2})^2+(z_t-z_{t-2})^2} & \ldots (t=2n, n \geq 1) \\ \sqrt{(x_t-x_{t-2})^2+(y_t-y_{t-2})^2+(z_t-z_{t-2})^2} & \ldots (t=2m+1, n \geq 1) \end{cases},$$

wherein f(t) represents the amplitude of the $t^{th}$ piece of acceleration data within the time period s, x(t) represents the x-axis acceleration corresponding to the $t^{th}$ piece of acceleration data, y(t) represents the y-axis acceleration corresponding to the $t^{th}$ piece of acceleration data, z(t) represents the z-axis acceleration corresponding to the $t^{th}$ piece of acceleration data, x(t−2) represents an x-axis acceleration corresponding to a $(t-2)^{th}$ piece of acceleration data, y(t−2) represents a y-axis acceleration corresponding to the $(t-2)^{th}$ piece of acceleration data, z(t−2) represents a z-axis acceleration corresponding to the $(t-2)^{th}$ piece of acceleration data, t represents the sequence of the acceleration data within the time period s; and performing ⑤;
⑤ Obtaining an average value $$F(s) = \frac{1}{T}\sum_{1}^{T} f(t)$$

of the amplitudes of all the acceleration data within the time period s, wherein T represents the quantity of the acceleration data within the time period s; and performing ⑥; and
⑥ Comparing the average value F(s) of the amplitudes of all the acceleration data within the time period s with a preset value, and determining whether or not the user falls at present according to a comparison result;

the dynamic threshold detection algorithm includes:

I: Obtaining acceleration data sequentially output by the acceleration sensor, wherein the acceleration data includes an x-axis acceleration, a y-axis acceleration, and a z-axis acceleration; and performing II;

II: Calculating, when N pieces of acceleration data are obtained, an average value of the N pieces of acceleration data, using the average value as a dynamic threshold, and performing III;

III: Comparing acceleration data obtained every time after the dynamic threshold is worked out with the dynamic threshold, determining whether or not the user steps according to a comparison result, and performing IV; and IV: Recalculating an average value of the N pieces of acceleration data obtained after the dynamic threshold is worked out, updating the dynamic threshold, and returning to III.

8. The intelligent sensing device according to claim 1, wherein original sampling data output by the sensors is saved by the processing module to be directly used as sensor data, or data obtained after the original sampling data output by the sensors is processed through a preset processing method is saved by the processing module to be used as sensor data, wherein the preset processing method at least includes a first processing method, a second processing method and a third processing method; different processing methods correspond to the different modes of the sensing device, and the user selects the preset pressing method by setting the mode of the sensing device;

the first processing method includes: obtaining $$\bar{x}_1 = \frac{1}{N}\sum_{i=1}^{N} x_i = \frac{x_1 + x_2 + x_3 + \ldots + x_N}{N},$$

$$\bar{x}_2 = \frac{1}{N}\sum_{i=N+1}^{2N} x_i = \frac{x_{N+1} + x_{N+2} + x_{N+3} + \ldots + x_{2N}}{N}, \ldots, \text{ and}$$

$$\bar{x}_N = \frac{1}{N}\sum_{i=(N-1)N}^{NN} x_i = \frac{x_{(N-1)N} + x_{(N-1)N+1} + \ldots + x_{NN}}{N},$$

wherein $x_N$ represents original sampling data obtained by a $N^{th}$ time of sampling of the sensors, $x_{2N}$ represents original sampling data obtained by a $2N^{th}$ time of sampling of the sensors, and $x_{NN}$ represents original sampling data obtained by a $NN^{th}$ time of sampling of the sensors;

the second processing method includes: obtaining $$K_1 = \frac{x_{max1} - x_{min1}}{N}(x_{max1}, x_{min1} \in \{x_1, x_2, x_3, \ldots x_N\}),$$

$$K_2 = \frac{x_{max2} - x_{min2}}{N}(x_{max2}, x_{min2} \in \{x_{N+1}, x_{N+2}, x_{N+3}, \ldots x_{2N}\}), \ldots, \text{ and}$$

$$K_N = \frac{x_{maxN} - x_{minN}}{N}(x_{maxN}, x_{minN} \in \{x_{(N-1)N}, x_{(N-1)N+1} \ldots x_{NN}\}),$$

wherein $x_N$ represents the original sampling data obtained by the $N^{th}$ time of sampling of the sensors, $x_{2N}$ represents the original sampling data obtained by the $2N^{th}$ time of sampling of the sensors, $x_{NN}$ represents the original sampling data obtained by the $NN^{th}$ time of sampling of the sensors, $x_{max1}$ represents a maximum value among original sampling data $x_1, x_2, x_3, \ldots x_N$ of the sensors, $x_{min1}$ represents a minimum value among the original sampling data $x_1, x_2, x_3, \ldots x_N$ of the sensors, $x_{max2}$ represents a maximum value among original sampling data $x_{N+1}, x_{N+2}, x_{N+3}, \ldots x_{2N}$ of the sensors, $x_{min2}$ represents a minimum value among the original sampling data $x_{N+1}, x_{N+2}, x_{N+3}, \ldots x_{2N}$ of the sensors, $x_{maxN}$ represents a maximum value among original sampling data $x_{(N-1)N}, x_{(N-1)N+1}, \ldots x_{NN}$ of the sensors, and $x_{minN}$ represents a minimum value among the original sampling data $x_{(N-1)N}, x_{(N-1)N+1}, \ldots x_{NN}$ of the sensors;

the third processing method includes: ① calculating an average value and a variance of original sampling data of N sensors; and ② sequentially calculating the statistic $$T_i = \frac{x_i - \overline{X}}{S}$$

($i=1, 2, \ldots$, and N) of the original sampling data of the N sensors; rejecting original sampling data $x_i$ meeting $T_i \geq T_{\alpha,n}$ of the corresponding sensor, and returning to ① when original sampling data of N sensors are obtained again until the statistics of the original sampling data of all the sensors are calculated, wherein $\overline{X}$ represents the average value of the original sampling data of the N sensors, S represents the variance of the original sampling data of the N sensors, $x_i$ represents the original sampling data of the $i^{th}$ sensor, and $T_{\alpha,n}$ represents a critical value obtained with reference to the Grubbs Table;

the original sampling data of the sensors and the data obtained after the original sampling data of the sensors are processed through different processing methods are output in a data structural form including data information and data type information, and the original sampling data of the sensors and the different preset processing methods are distinguished according to different data type information.

9. The intelligent sensing device according to claim 1, wherein the sensing device is provided with a voiceprint recognition device; the user broadcasts WIFI configuration information by means of voiceprints, and the voiceprint recognition device analyzes and recognizes the voiceprints and then converts the voiceprints into the corresponding WIFI configuration information; and the user controls one or more sensing devices by means of voice through the voiceprint recognition device.

10. The intelligent sensing device according to claim 1, wherein the wireless communication module is able to work in an AP (Access Point) mode and an (STA Station) mode, and the AP mode is configured through the following steps:

A1: Enabling the AP mode, and performing A2;

A2: Waiting to obtain an IP, and performing A3;

A3: Establishing a Transmission Control Protocol (TCP) connection, and performing A4;

A4: Tracking the TCP connection, and performing A5;

A5: Receiving a TCP command, and performing A6;

A6: Determining the type of the TCP command, and performing A7;

A7: If the TCP command is an exit command or a configuration command, receiving the TCP command, and performing A8; or, if the TCP command is a command for reading sensing device information, reading sensor information, or reading error information, receiving the TCP command, and returning to A6;

A8: Sending an AP mode configuration result, and performing A9;
A9: Turning off the TCP connection, and performing A10;
A10: Configuring the STA mode, and performing A11; and
A11: Exiting a configuration process of the AP mode.

11. The intelligent sensing device according to claim 10, wherein the sensing device is able to be connected to a user terminal, and the user implements the configuration process of the AP mode by means of the user terminal, and checks AP mode configuration information, reading the sensing device information, reading the sensor information, and/or reading the error information via the user terminal.

12. The intelligent sensing device according to claim 11, wherein the sensing device at least comprises a USB interface, a microusb interface, and/or a miniUSB interface and is connected to the user terminal via the USB interface; the user terminal is a mobile phone, a tablet computer, or a PC; and data saved in the sensing device is guided into the user terminal via the USB interface.

13. A sensing system, comprising:
the plurality of intelligent sensing devices according to claim 1; and
a data platform connected with the plurality of sensing devices.

* * * * *